Patented Aug. 22, 1944

2,356,445

UNITED STATES PATENT OFFICE 2,356,445

CYANINE DYES

Leslie G. S. Brooker and Robert H. Sprague, Rochester, N. Y., assignors to Eastman Kodak Company, Rochester, N. Y., a corporation of New Jersey No Drawing. Application April 20, 1942, Serial No. 439,722

16 Claims. (Cl. 260—240)

This invention relates to cyanine dyes of a new type and to a process for the preparation thereof.

Cyanine dyes are known in which one or more of the hydrogen atoms of the polymethine chain between the two heterocyclic nuclei are substituted by alkyl groups, aryl groups, α-thienyl groups or halogen atoms. Also a kind of cyanine dye is known wherein the polymethine chain between the two heterocyclic nuclei passes through a cyclopentadiene nucleus. These dyes containing a cyclopentadiene nucleus can be prepared by condensing 2 molecular proportions of a cyclammonium quaternary salt, such as 2-methylmercaptobenzothiazole methyl-p-toluenesulfonate, with one molecular proportion of cyclopentadiene, in the presence of pyridine.

We have now found cyanine dyes in which the polymethine chain between the two heterocyclic nuclei passes through a benzene nucleus. Our new dyes cannot be obtained by a process analogous to that used for producing the aforesaid cyclopentadiene dyes. That is, our new dyes cannot be obtained by condensing two molecular proportions of a cyclammonium quaternary salt containing an alkylmercapto group, with one molecular proportion of benzene. Rather an entirely different sort of process must be employed to prepare our new dyes. Our new dyes sensitize photographic emulsions, we have found.

It is accordingly, an object of our invention to provide new dyes. A further object is to provide a process for preparing our new dyes. A still further object is to provide photographic emulsions sensitized with our new dyes and a process for preparing the same. Other objects will become apparent hereinafter.

In accordance with our invention, we prepare our new dyes by splitting out the elements of acid from a diquaternary salt of the following general formula:

wherein R represents an alkyl (e. g. methyl, ethyl, isoamyl, β-ethoxyethyl and benzyl) group, X represents an acid radical and Z represents the non-metallic atoms necessary to complete a benzothiazole (e. g. unsubstituted benzothiazole or 5-chlorobenzothiazole) or a naphthothiazole nucleus. The dyes thus obtained have the following general formula:

wherein R, X and Z have the values designated above.

The diquaternary salts employed are advantageously the dihalides. The elements of acid are advantageously split out from the diquaternary salt by treatment with ammonia. The following examples will serve to illustrate our new products and the manner of obtaining the same.

EXAMPLE 1.—*3,3'-diethyl - 8,11 - vinylene-thiadicarbocyanine iodide*

1.0 g. (1 mol.) of 2-(p-2-benzothiazolylbenzyl) benzothiazole diethiodide was suspended in 10 cc. of methyl alcohol at 20° to 25° C. To the resulting suspension, an excess of 10% ammonium hydroxide was added with stirring. A red solution was obtained. The thiadicarbocyanine iodide was salted out of this solution by addition of an ethyl alcoholic solution of sodium iodide. The resulting mixture was chilled to 0° C., the thiadicarbocyanine iodide filtered off with suction, washed on the filter with acetone and then with water, and finally dried in the air. The yield of brown crystals was 0.6 g., 74%. After crystallization from methyl alcohol (100 cc. per gram of dye), the thiadicarbocyanine iodide was obtained as bronze crystals, melting with decomposition at 225° to 227° C. The yield was 0.3 g., 37%. The dye sensitized a photographic gelatino-silver-bromiodide strongly to 6.90 mu with a broad maximum at 600 mu and a minimum at 510 mu.

The 2-(p-2-benzothiazolylbenzyl) benzothiazole diethiodide used above was prepared in the following manner: 3.0 g. (1 mol.) of 2-(p-2-benzothiazolylbenzyl) benzothiazole and 5.2 g. (2 mol.+100%) of diethylsulfate were heated together for 12 hours at 100° C. A gray solid cake was formed. This was washed by decantation with diethyl ether and then extracted with 100 cc. of hot methyl alcohol. A small amount of insoluble material was discarded. The product was precipitated from the methyl alcohol extract as the diiodide by the addition of an alcoholic solution of sodium iodide. The yield of gray crystals was 2.3 g., 41%. This diiodide was very unstable, turning pink on standing or in solution. It was used immediately.

The 2-(p-2-benzothiazolylbenzyl) benzothiazole used above was prepared as follows: 12.5 g. (2 mol.+10%) of o-aminothiophenol were placed in a 500 cc. three-neck round-bottom flask under a stream of dry carbon dioxide. 9.7 g. (1 mol.) of homoterephthalyl chloride were then added dropwise with shaking. A violent reaction occurred with formation of a solid brown cake. The reaction mixture was then heated to 150° C. for ten minutes, cooled, and stirred with 50 cc. of warm 5% aqueous sodium hydroxide. The benzothiazole was filtered off with suction, washed on the filter with water and recrystallized from acetone. The yield of tan needles was 6.5 g., 40%. A further recrystallization from acetone (36 cc. per g.) gave nearly colorless crystals, melting with decomposition at 150° to 154° C. The yield was 31%.

The homoterephthalyl chloride used above was prepared in the following manner: 18.0 g. (1 mol.) of homoterephthalic acid, 47.6 g. (2 mol.+100%) of thionyl chloride and 100 cc. of benzene were refluxed together for nine hours. The acid dissolved slowly, giving a clear solution at the end of three hours. The solvent was then distilled off under reduced pressure. The product was thus obtained as a nearly colorless liquid. The yield was 12.5 g., 58%. The homoterephthalic acid was prepared by the method of M. Fileti and G. Baldracco—J. pr. Chem. 47, 532 (1893).

EXAMPLE 2.—*3,3'-dimethyl-8,11-vinylene-thiadicarbocyanine iodide*

1.29 g. (1 mol.) of 2-(p-2-benzothiazolylbenzyl)benzothiazole dimethiodide were suspended in 10 cc. of methyl alcohol at 20° to 25° C. To the resulting suspension, an excess of 10% ammonium hydroxide was added with stirring. The thiadicarbocyanine iodide was salted out of this solution by addition of an ethyl alcoholic solution of sodium iodide. The resulting mixture was chilled to 0° C., the thiadicarbocyanine filtered off with suction, washed on the filter with acetone and then with water, and finally dried in the air. The yield of dark crystals was 0.9 g., 90%. After recrystallization from methyl alcohol (100 cc. per gram), the thiadicarbocyanine was obtained as dark green crystals, melting with decomposition at 163° to 166° C. The yield was 0.45 g., 45%. The dye sensitized a photographic gelatino-silver-halide emulsion strongly out to 600 mu. with a maximum at 560 mu.

In a similar manner, 3,3'-diethyl-8,11-vinylene-4,5,4',5'-dibenzothiadicarbocyanine iodide can be prepared from 2-(p-2-β-naphthothiazolylbenzyl)-β-(naphthothiazole diethiodide.

Our new dyes give rise to two extreme resonance configurations which are not identical in spite of the fact that the nuclei at each end are the same. In one configuration the benzene ring is in the quinonoid and in the other, the benzene ring is in the more stable benzenoid state. This can be illustrated in the case of a benzothiazole dye as follows:

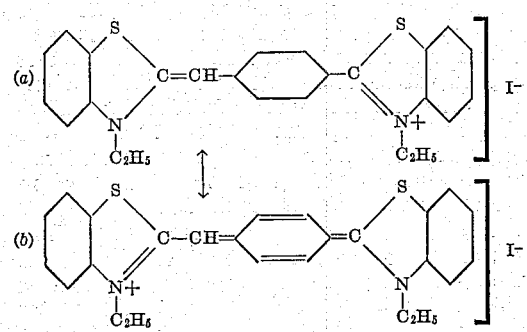

Configuration *a* is therefore preferred and resonance in this dye is not as intense as in the ordinary type of cayanine dye. The color (red) is lighter than that of the ordinary thiadicarbocyanine which also has a 5-carbon chain. Whereas the ordinary thiacyanines are remarkably stable toward alkali, this dye is relatively sensitive, its color being discharged by triethylamine in alcoholic solution. The change is reversible.

In the preparation of photographic emulsions containing our new dyes, it is only necessary to disperse the dyes in the emulsions. The methods of incorporating dyes in emulsions are simple and well known to those skilled in the art. It is convenient to add the dyes from solutions in appropriate solvents. Methanol has proven satisfactory as a solvent for our new dyes. Ethyl alcohol or acetone may also be employed where the solubility of the dyes in methanol is lower than desired.

Sensitization by means of our new dyes is, of course, directed primarily to the ordinarily employed gelatino-silver-halide developing-out emulsions. The dyes are advantageously incorporated in the washed, finished emulsions and should, of course, be uniformly distributed throughout the emulsions.

The concentration of our new dyes in the emulsion can vary widely, i. e. from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromiodide) emulsions. With fine-grain emulsions, which includes most of the ordinarily employed gelatino-silver chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes may be incorporated by bathing a plate or film upon which an emulsion has been coated, in the solution of the dye, in an appropriate solvent. Bathing methods, however, are not to be preferred ordinarily.

What we claim as our invention and desire to be secured by Letters Patent of the United States is:

1. A cyanine dye of the following general formula:

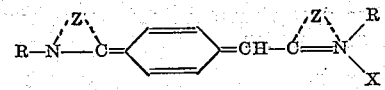

wherein R represents an alkyl group, X represents an acid radical and Z represents the non-metallic atoms necessary to complete a heterocyclic nucleus selected from the group consisting of benzothiazole and naphthothiazole nuclei.

2. A cyanine dye of the following general formula:

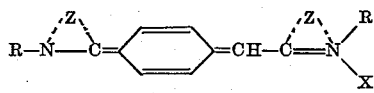

wherein R represents an alkyl group, X represents an acid radical and Z represents the non-metallic atoms necessary to complete a benzothiazole nucleus.

3. A cyanine dye of the following general formula:

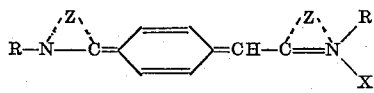

wherein R represents an alkyl group, X represents a halide radical and Z represents the non-metallic atoms necessary to complete a benzothiazole nucleus.

4. A cyanine dye of the following general formula:

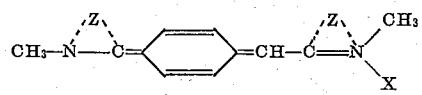

wherein X represents an acid radical and Z represents the non-metallic atoms necessary to complete a benzothiazole nucleus.

5. A cyanine dye of the following general formula:

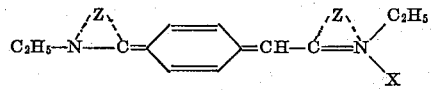

wherein X represents an acid radical and Z represents the non-metallic atoms necessary to complete a benzothiazole nucleus.

6. A cyanine dye of the following general formula:

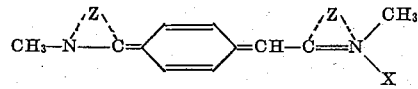

wherein X represents a halide radical and Z represents the non-metallic atoms necessary to complete a benzothiazole nucleus.

7. A cyanine dye of the following general formula:

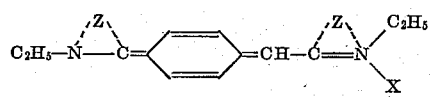

wherein X represents a halide radical and Z represents the non-metallic atoms necessary to complete a benzothiazole nucleus.

8. 3,3' - dimethyl-8,11-vinylenethiadicarbocyanine iodide.

9. 3,3'-diethyl-8,11-vinylenethiadicarbocyanine iodide.

10. A process for preparing a cyanine dye comprising splitting out the elements of acid from a compound of the following general formula:

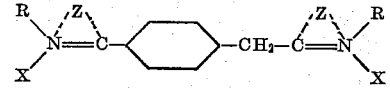

wherein R represents an alkyl group, X represents an acid radical and Z represents the non-metallic atoms necessary to complete a heterocyclic nucleus selected from the group consisting of benzothiazole and naphthothiazole nuclei.

11. A process for preparing a cyanine dye comprising splitting out the elements of acid, in the presence of ammonia, from a compound of the following general formula:

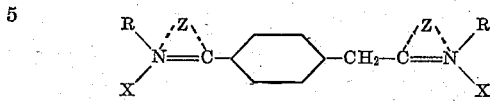

wherein R represents an alkyl group, X represents an acid radical and Z represents the non-metallic atoms necessary to complete a heterocyclic nucleus selected from the group consisting of benzothiazole and naphthothiazole nuclei.

12. A process for preparing a cyanine dye comprising splitting out the elements of acid from a compound of the following general formula:

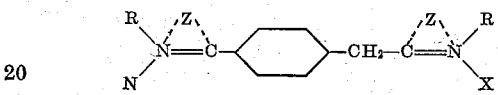

wherein R represents an alkyl group, X represents a halide radical and Z represents the non-metallic elements necessary to complete a benzothiazole nucleus.

13. A process for preparing a cyanine dye comprising splitting out the elements of acid, in the presence of ammonia, from a compound of the following general formula:

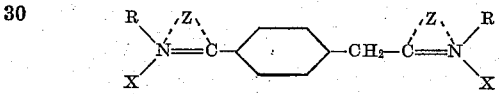

wherein R represents an alkyl group, X represents a halide radical and Z represents the non-metallic elements necessary to complete a benzothiazole nucleus.

14. A process for preparing a cyanine dye comprising splitting out the elements of acid, in the presence of ammonia, from a compound of the following general formula:

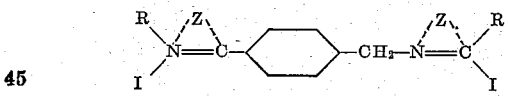

wherein R represents an alkyl group and Z represents the non-metallic atoms necessary to complete a benzothiazole nucleus.

15. A process for preparing a cyanine dye comprising splitting out the elements of acid, in the presence of ammonia, from a compound of the following formula:

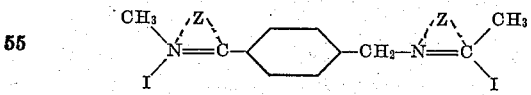

wherein Z represents the non-metallic atoms necessary to complete a benzothiazole nucleus.

16. A process for preparing a cyanine dye comprising splitting out the elements of acid, in the presence of ammonia, from a compound of the following formula:

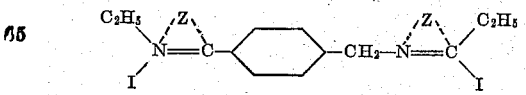

wherein Z represents the non-metallic atoms necessary to complete a benzothiazole nucleus.

LESLIE G. S. BROOKER.
ROBERT H. SPRAGUE.

CERTIFICATE OF CORRECTION.

Patent No. 2,356,445.　　　　　　　　　　　　　　August 22, 1944.

LESLIE G. S. BROOKER, ET AL.

It is hereby certified that error appears in the printed specification of the above numbered patent requiring correction as follows: Page 1, first column, line 45, for that portion of the formula reading "=CH" read -- —$CH_2$ --; page 2, first column, line 44, strike out the opening parenthesis before "naphthothiazole"; line 70, for "cayanine" read --cyanine--; and that the said Letters Patent should be read with this correction therein that the same may conform to the record of the case in the Patent Office.

Signed and sealed this 28th day of November, A. D. 1944.

Leslie Frazer (Seal)　　　　　　　　　　　　　　　　　　Acting Commissioner of Patents.